May 24, 1932.  F. E. KEY  1,859,972
SAFETY PIPE FITTING
Filed Jan. 22, 1931  2 Sheets-Sheet 1
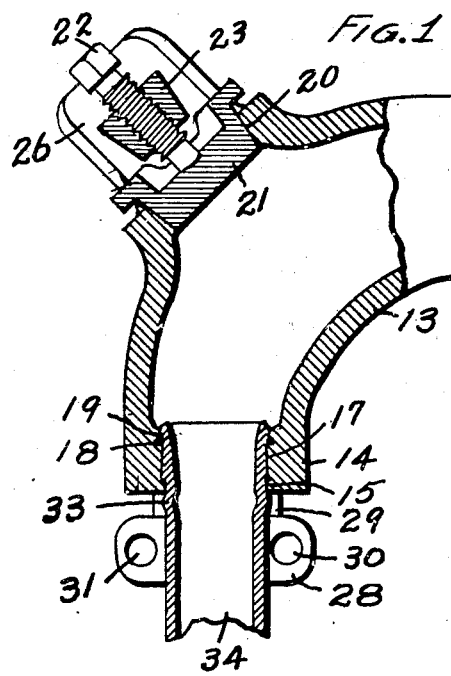
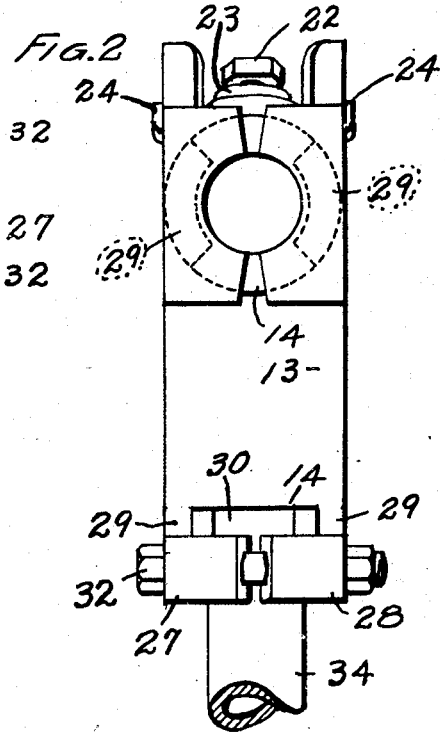
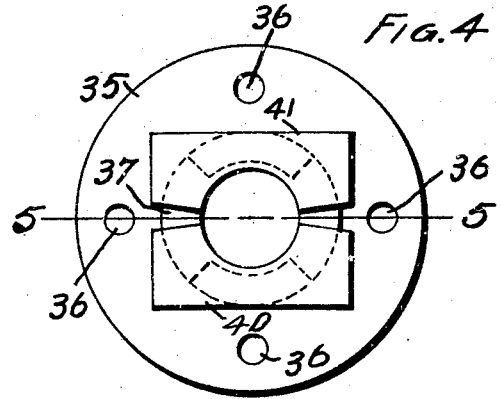
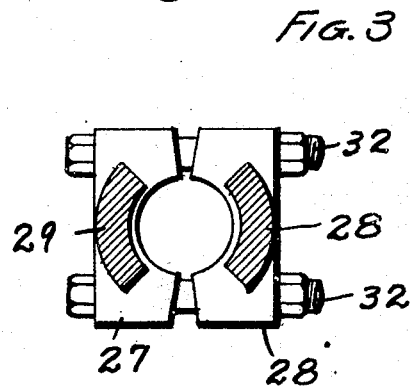
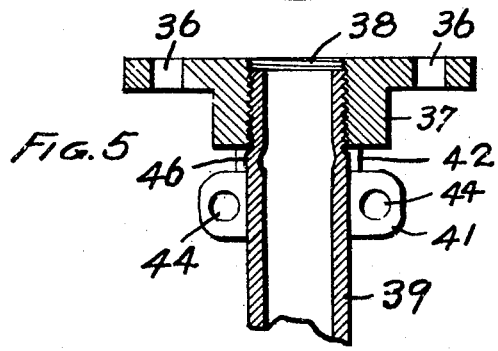
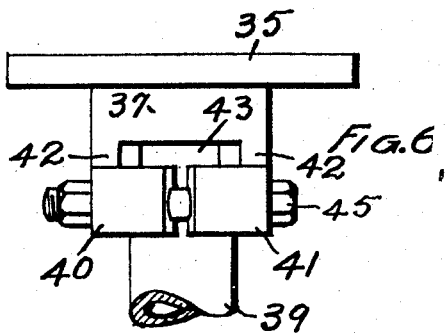
INVENTOR
FREDERICK E. KEY
By Walter C. Stein
ATTY.

May 24, 1932.　　　　F. E. KEY　　　　1,859,972
SAFETY PIPE FITTING
Filed Jan. 22, 1931　　2 Sheets-Sheet 2
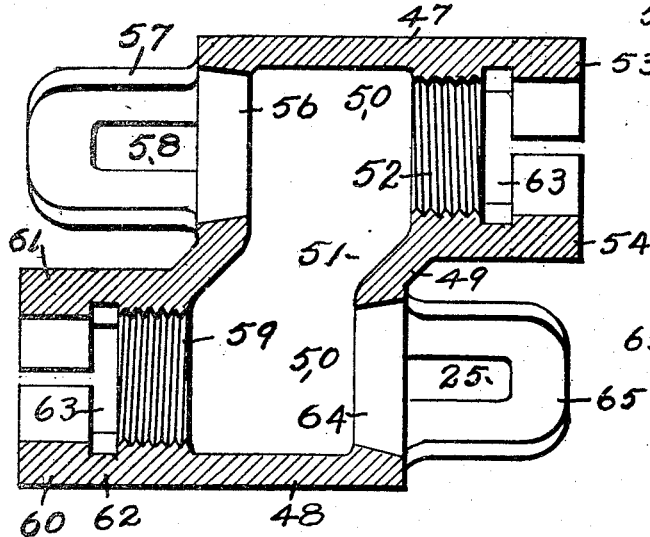
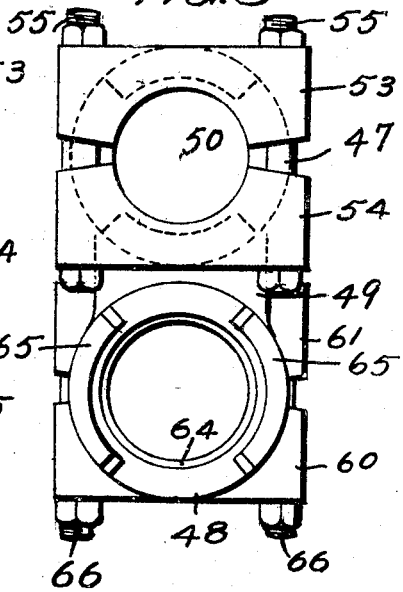
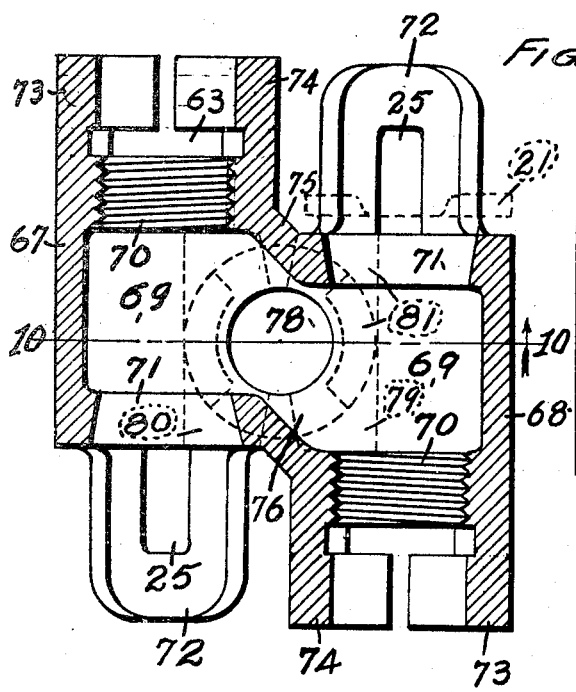
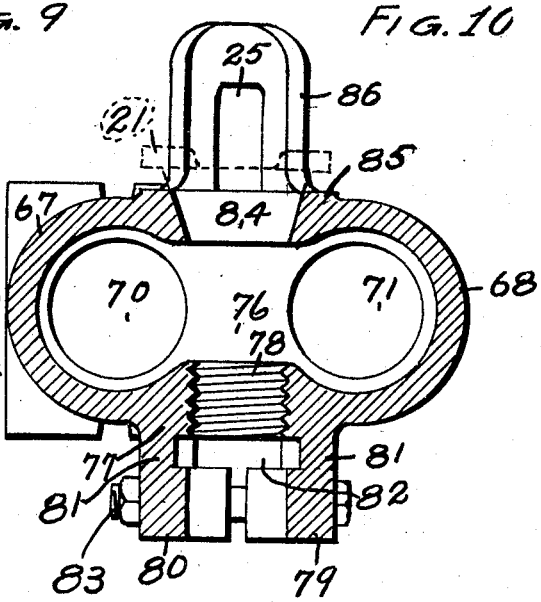
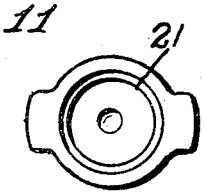
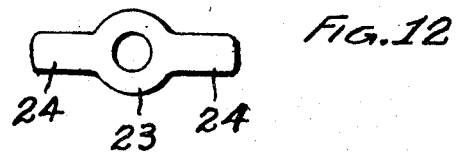
INVENTOR
FREDERICK E. KEY
BY Walter C. Stein
ATTY.

Patented May 24, 1932

1,859,972

UNITED STATES PATENT OFFICE

FREDERICK E. KEY, OF ST. LOUIS, MISSOURI, ASSIGNOR TO KEY BOILER EQUIPMENT COMPANY, OF EAST ST. LOUIS, ILLINOIS, A CORPORATION OF MISSOURI

SAFETY PIPE FITTING

Application filed January 22, 1931. Serial No. 510,417.

My invention relates to improvements in safety pipe fittings, and has for its primary object pipe fittings which are designed to be used on high pressure lines of any type.

A further object is to construct a pipe fitting which is provided with an additional pipe retaining means so that there will be no danger of the pipe when becoming loosened in the fitting through any cause whatsoever from blowing out of the fitting and causing considerable damage.

Heretofore in the use of pipe fittings for oil stills and similar pipe lines used to convey highly heated gases or liquids, it frequently happened that the pipe fitting and pipe would become loosened to such an extent that the fitting and pipe would separate and upon the contents of the pipe line striking the air they would immediately burst into flame, causing a very serious fire.

A still further object is to construct a pipe fitting provided with an auxiliary pipe retaining means, which auxiliary retaining means is so located relative to the fitting itself as to leave an opening or tell-tale at the end of the fitting. By this construction any loosening of the pipe in the fitting can be readily discovered and remedied before any serious damage occurs.

In the drawings,

Fig. 1 is a side elevation of an L with parts broken away and in section, showing my improved construction;

Fig. 2 is an end view of the same;

Fig. 3 is a section taken on the line 3—3 of Fig. 1;

Fig. 4 is a top plan view of my improvement as attached to a flange coupling;

Fig. 5 is a vertical section taken on the line 5—5 of Fig. 4;

Fig. 6 is a side elevation of Fig. 4;

Fig. 7 is a horizontal section of my improvement when applied to a pipe coupling;

Fig. 8 is an end view of the same;

Fig. 9 is a longitudinal section of my device as applied to a T;

Fig. 10 is a section taken on the line 10—10 of Fig. 9;

Fig. 11 is a top plan view of the cap employed; and

Fig. 12 is a top plan view of the nut made use of in securing the cap in position.

In the construction of my device I employ a body portion 13 which is made of any desired shape, in Fig. 1, this shape being an L or one-fourth of a circle, so that the device can be used as an elbow or a corner fitting.

The ends 14 of the fitting are bored so as to provide a shoulder 15, adjacent which is a tapered portion 17 which terminates in an annular groove 18, and adjacent the annular groove 18 is a tapered portion 19. This style of boring or arranging the openings in the ends 14 is to permit the end of a pipe to be rolled and tightly seated in the fitting by means of a tube expander. This tube expander is inserted through a cap opening 20 formed in the L, the opening being so arranged that access can be had to either of the ends 14.

The opening 20 is tapered and is designed to receive a cap 21, which cap is secured in position by means of a set screw or similar fastening means 22. The set screw 22 passes through a nut 23 which nut is provided with extensions or arms 24, these arms passing through slots 25 (see Figs. 7 to 10, inclusive) which are formed in the lugs 26. These lugs are located to either side of the opening 20 and are diametrically opposite each other.

Located at a distance from each of the ends 14 is the auxiliary securing means which consists of a pair of spaced apart members 27 and 28. These members are united to the body portion 13 by flexible ribs 29. These ribs extend only partially around the pipe, thus leaving an open space 30 which may be termed a telltale. The members 27 and 28 are provided with openings 31 through which bolts 32 pass. These bolts are for the purpose of drawing the sections 28 and 27 together so as to tightly encircle the pipe.

It will be noted from Fig. 1 that when the pipe is rolled in its seat a bulge 33 is formed in the pipe between the members 27 and 28 and the end 14 of the body portion 13. This bulging or swelling prevents the pipe from being blown out of the fitting in the event the end of the pipe 34 becomes loosened.

In Fig. 4 I have shown a modified form of construction in which a flange 35 is provided. This flange has bolt openings 36 formed therein by means of which it can be attached to a similar flange. The flange 35 is provided with a boss 37, which boss may either be screw threaded as at 38 for the reception of the screw threaded end of a pipe 39, or it may be arranged similar to the opening or seat in the ends 14 of the body portion 13.

A pair of clamping members 40 and 41 are located at some distance beyond the end of the boss 37 and are connected to the boss by ribs 42. These ribs are spaced apart so as to leave the telltale 43. The members 40 and 41 are provided with openings 44 for the reception of bolts 45, these bolts being for the same purpose as the bolts 32. The pipe 39 is also provided with a bulged portion 46 which extends around the pipe and is located within the space between the members 40 and 41 and the end of the boss 37.

In Figs. 7 and 8 I have shown another form of construction commonly called a coupling. This coupling consists of a pair of members 47 and 48 which are joined together by means of a web 49. The members 47 and 48 are hollow, as indicated by the numeral 50, and these hollow portions are joined together by a cross-passage 51. One end of the member 47 is provided with a screw threaded opening or pipe seat 52, adjacent which are the clamping members 53 and 54. These members are spaced apart and are designed to be drawn together by means of bolts 55.

Opposite the screw threaded opening 52 is a tapered opening 56 which is designed to receive a cap similar to the cap 21. The cap so used is not illustrated in this Figure, as it is fully shown in Fig. 1.

A pair of lugs 57 are located on opposite sides of the opening 56 and are provided with slots 58 to receive the arms 24 of the nuts 23. The member 48 is provided with a screw threaded opening 59 and with split clamp members 60 and 61. These members are connected to the member 48 by a web 62 so arranged as to leave a tell-tale 63.

Opposite the opening 59 is a tapered opening 64 which also receives a cap. The member 48 is also provided with oppositely disposed lugs 65, which have the openings 25 therethrough to receive the arms 24 of the nut 23.

The clamp members 60 and 61 are drawn together by means of bolts 66. In Figs. 9 and 10 I have illustrated a T which is composed of members 67 and 68. These members have passages 69 formed therethrough, one end of which passage 69 is screw threaded as at 70. Opposite the screw threaded openings 70 are the tapered openings 71, which receive caps 23. Lugs 72 are provided on opposite sides of the openings 71 for receiving the set screws which secure the caps in position. Adjacent the screw threaded ends 70 are split clamping members 73 and 74, which clamping members are drawn together by means of bolts, as previously described. The passages 69 are connected together by means of a web 75 through which a passage 76 is formed so that communication may be had between the adjacent passages 69. The web 75 has formed on one side a boss 77, through which a screw threaded opening 78 extends. This opening communicates with the passage 76.

Adjacent the screw threaded opening 78 are formed clamping members 79 and 80. These members are also split and are connected by the boss 77 by means of spaced-apart ribs 81, these ribs being arranged to form the tell-tale 82. The clamping members 79 and 80 are drawn together by means of bolts 83. Directly opposite the opening 78 is a tapered opening 84, which is also designed to receive a cap. This opening 84 is formed through the web 77 and boss 85.

The boss 85 is provided with slotted extensions 86 for holding the nut through which the set screw to secure the cap in position passes. It will be noted from my construction that I have provided a pipe fitting which may be made in any desired form, which contains a safety collar or clamp so that in the event of the end of a pipe secured in the fitting becoming loosened it will be impossible for the pipe to blow out. I have discovered that when hot gases or fluids are handled by a pipe line, the pipe due to its thinner walls becomes heated more rapidly than the fitting. This causes the pipe to expand in the fitting, thus having a tendency to compress the molecules contained in the structure of the pipe. Then upon the cooling, the pipe being of thinner construction, cools more readily and becomes loosened. Then when the pipe line is again placed in operation, a certain amount of carbon or other solids carried over in the pipe line will enter between the outside of the pipe and the door of the fitting; then upon the expanding of the pipe the pipe will be crushed inwardly and through constant reheatings and coolings the pipe will gradually become loosened in the fitting and if not restrained in any manner will blow out, permitting the heated contents to be scattered in the atmosphere and most probably catch fire or cause other serious damage. Where the pipe line is used for conveying super-heated gases instead of solids lodged around the outside of the pipe where it is secured in the fitting, these gases will lodge, and especially in the case of super-heated steam, will have a tendency to corrode and rust, thus again having a tendency to loosen the pipe within the fitting.

While I have illustrated Fig. 1 as having what may be termed a smooth bore fitting and the remainder of the fittings disclosing screw threads, it is to be understood that either kind of opening or pipe seat may be used in connection with any of the fittings, this depending entirely upon the choice of the user.

I claim:

1. A safety pipe fitting comprising a hollow body portion, a pipe seat formed in one end of said body portion, an auxiliary clamping means carried by said body portion and spaced outwardly from said body portion, and means for securing said clamping means around a pipe whose end is secured in said seat.

2. A safety pipe fitting comprising a hollow body portion having aligned openings therein, a cap for closing one of said openings, means for securing said cap in said opening, a pipe seat formed in the opposing opening, clamping members integral with said body portion in alignment with and spaced longitudinally from said pipe seat, and means for drawing said clamping members into close contact with a pipe secured in said seat.

3. A safety pipe fitting comprising a hollow body portion, a pipe seat formed in said body portion and communicating with said hollow portion, integral flexible diametrically opposite ribs extending outwardly from said body portion, clamping members carried by said ribs in longitudinally spaced axial alignment to said tube seat so as to provide tell-tale openings, and means for drawing said clamping members toward each other and clamping the same around a pipe secured in and projecting from said seat.

4. A safety pipe fitting comprising a hollow body portion having aligned openings therein, a cap for closing one of said openings, means for securing said cap in said opening, a pipe seat formed in the opposing opening and adapted to have a pipe secured therein, clamping members carried by said body portion in alignment with and spaced away from said pipe seat, means for drawing said clamping members into close contact with said pipe, slotted lugs projecting from said body portion adjacent said cap opening, and removable means carried by said lugs for securing said cap in position.

5. A pipe fitting comprising a pair of hollow members, a web connecting said members, a passageway formed in said web and communicating with the interior of said members, a pipe seat formed in each of said members, clamping members carried by and spaced longitudinally of said first mentioned members adjacent and concentric with said pipe seats, said members being so positioned as to leave tell-tale openings adjacent said pipe seats and adapted to be clamped about a pipe secured in each of said seats, a cap seat formed in each of said hollow members, and a cap removably secured in each of said cap seats.

6. A pipe fitting comprising a pair of hollow members, a web connecting said members, a passageway formed in said web and communicating with the interior of said members, a pipe seat formed in each of said members and adapted to have a pipe secured therein, clamping members carried by said first mentioned members adjacent said pipe seats, said members being so positioned as to leave telltale openings adjacent said pipe seats whereby leakage between said pipes and seats can be discovered, a cap seat formed in each of said hollow members, a cap removably secured in each of said cap seats, and means for removably securing said caps in said cap seats.

In testimony whereof, I have hereunto affixed my hand this 19th day of January, A. D. 1931, in the city of East St. Louis, county of St. Clair and State of Illinois.

FREDERICK E. KEY.